(12) United States Patent
Ingram

(10) Patent No.: US 8,827,643 B2
(45) Date of Patent: Sep. 9, 2014

(54) TURBINE BUCKET PLATFORM LEADING EDGE SCALLOPING FOR PERFORMANCE AND SECONDARY FLOW AND RELATED METHOD

(75) Inventor: Clint Luigie Ingram, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 478 days.

(21) Appl. No.: 13/282,053

(22) Filed: Oct. 26, 2011

(65) Prior Publication Data

US 2013/0108450 A1    May 2, 2013

(51) Int. Cl.
*F01D 11/06* (2006.01)
*F01D 5/14* (2006.01)

(52) U.S. Cl.
CPC .......... *F01D 5/143* (2013.01); *F05D 2250/184* (2013.01); *F05D 2240/80* (2013.01); *F01D 5/145* (2013.01)
USPC .......................................... 416/1; 416/193 A

(58) Field of Classification Search
USPC .......... 416/193 A, 193 R, 189, 191, 192, 248, 416/239, 1
See application file for complete search history.

(56) References Cited

U.S. PATENT DOCUMENTS

| 6,413,045 | B1* | 7/2002 | Dancer et al. ............. 415/173.6 |
| 7,134,842 | B2 | 11/2006 | Tam et al. |
| 7,189,063 | B2* | 3/2007 | Honkomp ................. 416/193 A |
| 7,465,152 | B2 | 12/2008 | Nigmatulin |
| 2010/0080708 | A1 | 4/2010 | Gupta et al. |
| 2010/0119364 | A1 | 5/2010 | Bunker |
| 2011/0044818 | A1 | 2/2011 | Kuhne et al. |
| 2011/0236200 | A1* | 9/2011 | Grover et al. ............. 415/208.1 |

* cited by examiner

*Primary Examiner* — Edward Look
*Assistant Examiner* — William Grigos
(74) *Attorney, Agent, or Firm* — Nixon & Vanderhye P.C.

(57) ABSTRACT

A turbine bucket includes a platform and an airfoil. A leading edge of the platform leading is circumferentially defined by a continuous curve forming at least one axially extending projection and an adjacent recess, the axially-extending projection located adjacent a leading edge of the airfoil.

18 Claims, 5 Drawing Sheets

TURBINE BUCKET PLATFORM LEADING EDGE SCALLOPING FOR PERFORMANCE AND SECONDARY FLOW AND RELATED METHOD

BACKGROUND OF THE INVENTION

The present invention relates generally to rotary machines and, more particularly, to the control of forward wheel space cavity purge flow and combustion gas flow at the leading angel wing seals on a gas turbine bucket.

A typical turbine engine includes a compressor for compressing air that is mixed with fuel. The fuel-air mixture is ignited in a combustor to generate hot, pressurized combustion gases in the range of about 1100° C. to 2000° C. that expand through a turbine nozzle, which directs the flow to high and low-pressure turbine stages thus providing additional rotational energy to, for example, drive a power-producing generator.

More specifically, thermal energy produced within the combustor is converted into mechanical energy within the turbine by impinging the hot combustion gases onto one or more bladed rotor assemblies. Each rotor assembly usually includes at least one row of circumferentially-spaced rotor blades or buckets. Each bucket includes a radially outwardly extending airfoil having a pressure side and a suction side. Each bucket also includes a dovetail that extends radially inward from a shank extending between the platform and the dovetail. The dovetail is used to mount the bucket to a rotor disk or wheel.

As known in the art, the rotor assembly can be considered as a portion of a stator-rotor assembly. The rows of buckets on the wheels or disks of the rotor assembly and the rows of stator vanes on the stator or nozzle assembly extend alternately across an axially oriented flowpath for the combustion gases. The jets of hot combustion gas leaving the vanes of the stator or nozzle act upon the buckets, and cause the turbine wheel (and rotor) to rotate in a speed range of about 3000-15,000 rpm, depending on the type of engine.

As depicted in the figures described below, an axial/radial opening at the interface between the stationary nozzle and the rotatable buckets at each stage can allow hot combustion gas to exit the hot gas path and enter the cooler wheelspace of the turbine engine located radially inward of the buckets. In order to limit this leakage of hot gas, the blade structure typically includes axially projecting angel wing seals. According to a typical design, the angel wings cooperate with projecting segments or "discouragers" which extend from the adjacent stator or nozzle element. The angel wings and the discouragers overlap (or nearly overlap), but do not touch each other, thus restricting gas flow. The effectiveness of the labyrinth seal formed by these cooperating features is critical for limiting the undesirable ingestion of hot gas into the wheelspace radially inward of the angel wing seals.

As alluded to above, the leakage of the hot gas into the wheelspace by this pathway is disadvantageous for a number of reasons. First, the loss of hot gas from the working gas stream causes a resultant loss in efficiency and thus output. Second, ingestion of the hot gas into turbine wheelspaces and other cavities can damage components which are not designed for extended exposure to such temperatures.

One well-known technique for reducing the leakage of hot gas from the working gas stream involves the use of cooling air, i.e., "purge air", as described in U.S. Pat. No. 5,224,822 (Lenehan et al). In a typical design, the air can be diverted or "bled" from the compressor, and used as high-pressure cooling air for the turbine cooling circuit. Thus, the cooling air is part of a secondary flow circuit which can be directed generally through the wheelspace cavities and other inboard rotor regions. This cooling air can serve an additional, specific function when it is directed from the wheel-space region into one of the angel wing gaps described previously. The resultant counter-flow of cooling air into the gap provides an additional barrier to the undesirable flow of hot gas through the gap and into the wheelspace region.

While cooling air from the secondary flow circuit is very beneficial for the reasons discussed above, there are drawbacks associated with its use as well. For example, the extraction of air from the compressor for high pressure cooling and cavity purge air consumes work from the turbine, and can be quite costly in terms of engine performance. Moreover, in some engine configurations, the compressor system may fail to provide purge air at a sufficient pressure during at least some engine power settings. Thus, hot gases may still be ingested into the wheelspace cavities.

Angel wings as noted above, are employed to establish seals upstream and downstream sides of a row of buckets and adjacent stationary nozzles. Specifically, the angel wing seals are intended the prevent the hot combustion gases from entering the cooler wheelspace cavities radially inward of the angel wing seals and, at the same time, prevent or minimize the egress of cooling air in the wheelspace cavities to the hot gas stream. Thus, with respect to the angel wing seal interface, there is a continuous effort to understand the flow patterns of both the hot combustion gas stream and the wheelspace cooling or purge air.

For example, it has been determined that even if the angel wing seal is effective and preventing the ingress of hot combustion gases into the wheelspaces, the impingement of combustion gas flow vortices on the surface of the seal may damage the seal and shorten the service life of the bucket.

The present invention seeks to provide unique angel wing seal and/or bucket platform geometry to better control the flow of secondary purge air at the angel wing interface to thereby also control the flow of combustion gases at that interface in a manner that extends the service life of the angel wing seal and hence the bucket itself.

BRIEF SUMMARY OF THE INVENTION

In one exemplary but nonlimiting embodiment, the invention provides a turbine bucket comprising a platform and an airfoil extending radially outwardly from the platform; wherein a leading edge of the platform is circumferentially defined by a continuous curve forming at least one axially-extending projection and an adjacent recess, the axially-extending projection located adjacent a leading edge of the airfoil.

In another aspect, the invention provides a turbine rotor wheel comprising a disk mounting a plurality of buckets about a radially outer periphery of the disk, each bucket formed with a platform and an airfoil extending radially outwardly from the platform; wherein a leading edge of the platform of each of the plurality of buckets is defined by a continuous curve forming at least one axially-extending projection and an adjacent recess, the at least one axially-extending projection located substantially adjacent a leading edge of the airfoil, such that the continuous curves of the plurality of buckets combine to form a circumferential continuous curve alternating between respective ones of the axially-extending projections and the adjacent recesses.

In still another aspect, the invention provides a method of controlling secondary purge air flow along an angel wing seal flange located radially inward of a turbine bucket platform leading edge comprising identifying an area of peak static combustion gas pressure along the platform leading edge where hot combustion gas vortices impinge on the angel wing seal flange; and shaping the platform leading edge so as substantially block the combustion gas vortices from impinging on the angel wing seal flange in the area.

The invention will now be described in detail in connection with the drawings identified below.

DETAILED DESCRIPTION OF THE INVENTION

Figure 1:
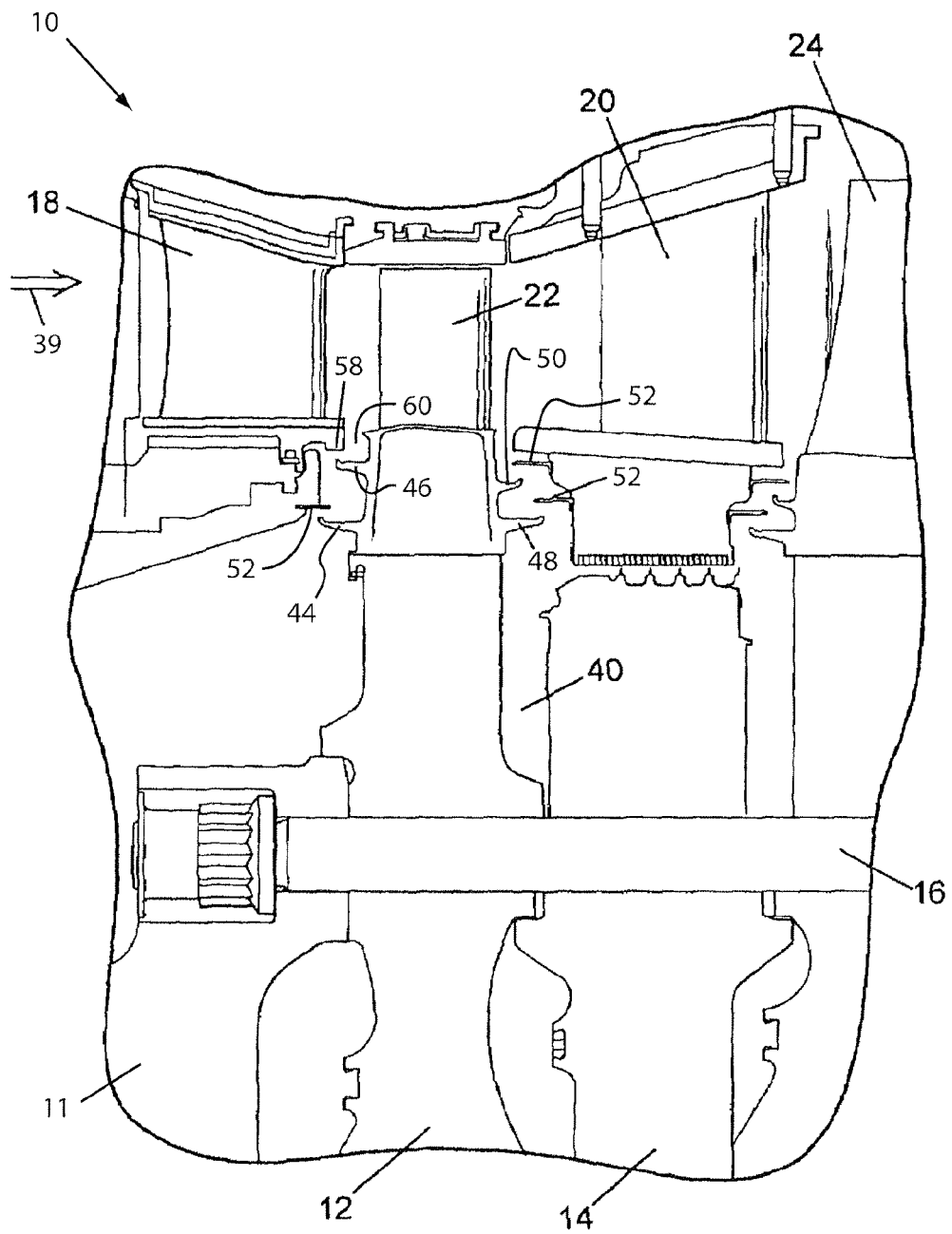
FIG. 1 is a is a fragmentary schematic illustration of a cross-section of a portion of a turbine.

FIG. 1 schematically illustrates a section of a gas turbine, generally designated 10, including a rotor 11 having axially spaced rotor wheels 12 and spacers 14 joined one to the other by a plurality of circumferentially spaced, axially-extending bolts 16. Turbine 10 includes various stages having nozzles, for example, first-stage nozzles 18 and second-stage nozzles 20 having a plurality of circumferentially-spaced, stationary stator blades. Between the nozzles and rotating with the rotor and rotor wheels 12 are a plurality of rotor blades, e.g., first and second-stage rotor blades or buckets 22 and 24, respectively.

Figure 2:
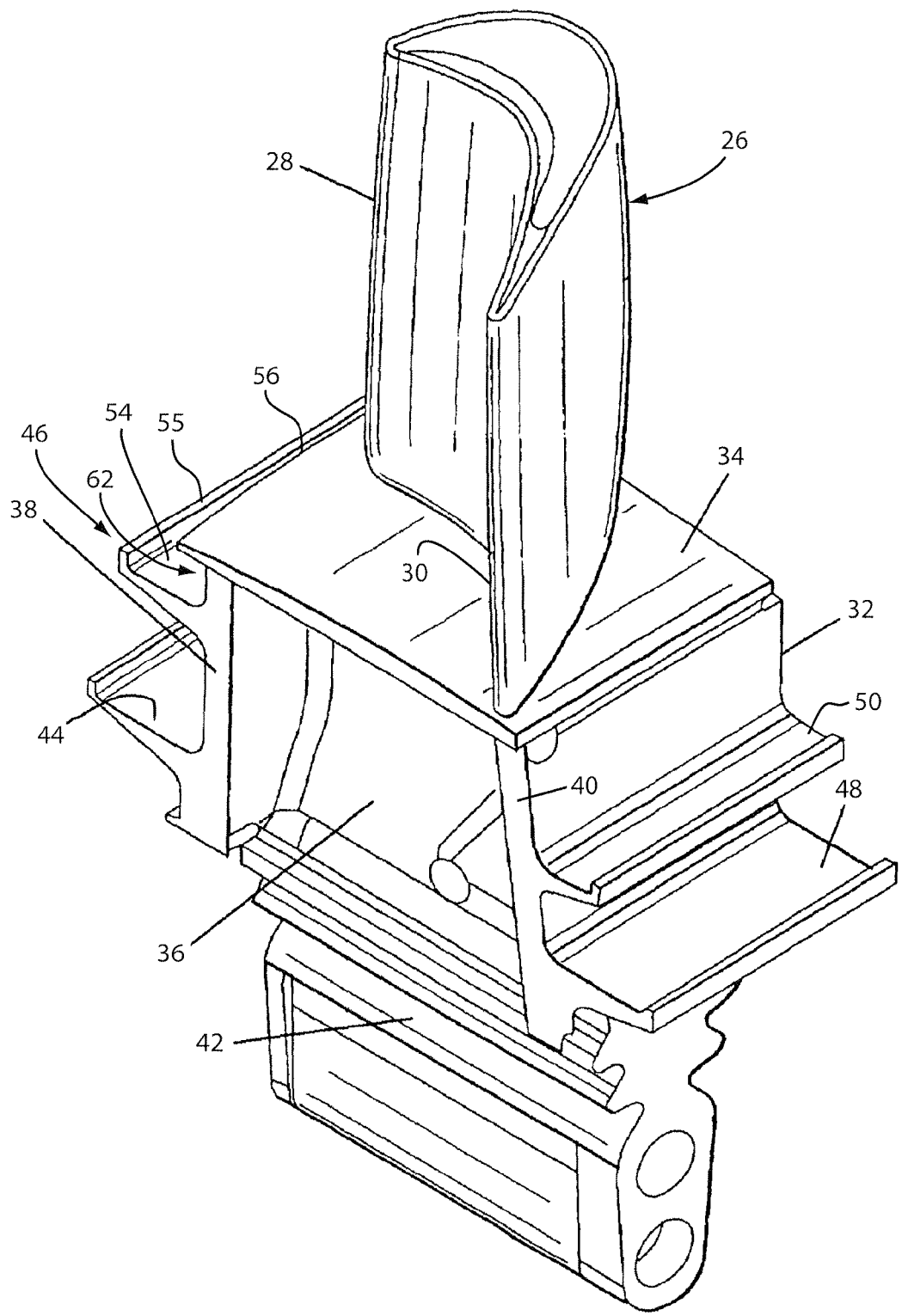
FIG. 2 is an enlarged perspective view of a turbine blade.

Referring to FIG. 2, each bucket (for example, bucket 22 of FIG. 1) includes an airfoil 26 having a leading edge 28 and a trailing edge 30, mounted on a shank 32 including a platform 34 and a shank pocket 36 having integral cover plates 38, 40. A dovetail 42 is adapted for connection with generally corresponding dovetail slots formed on the rotor wheel 12 (FIG. 1). Bucket 22 is typically integrally cast and includes axially projecting angel wing seals 44, 46 and 48, 50. Seals 46, 48 and 50 cooperate with lands 52 (see FIG. 1) formed on the adjacent nozzles to limit ingestion of the hot gases flowing through the hot gas path, generally indicated by the arrow 39 (FIG. 1), from flowing into wheel spaces 41.

Of particular concern here is the upper or radially outer angel wing seal 46 on the leading edge end of the bucket. Specifically, the angel wing 46 includes a longitudinal extending wing or seal flange 54 with an upturned edge 55. The bucket platform leading edge 56 extends axially beyond the cover plate 38, toward the adjacent nozzle 18. The upturned edge 55 of seal flange 54 is in close proximity to the surface 58 of the nozzle 18 thus creating a tortuous or serpentine radial gap 60 as defined by the angel wing seal flanges 44, 46 and the adjacent nozzle surface 58 where combustion gas and purge air meet (see FIG. 1). In addition, the seal flange 54 upturned edge 55 and the edge 56 of platform 34 form a so-called "trench cavity" 62 where cooler purge air escaping from the wheel space interfaces with the hot combustion gases. As described further below, by maintaining cooler temperatures within the trench cavity 62, service life of the angel wing seals, and hence the bucket itself, can be extended.

In this regard, the rotation of the rotor, rotor wheel and buckets create a natural pumping action of wheel space purge air (secondary flow) in a radially outward direction, thus forming a barrier against the ingress of the higher temperature combustion gases (primary flow). At the same time, CFD analysis has shown that the strength of a so-called "bow wave," i.e., the higher pressure combustion gases at the leading edge 28 of the bucket airfoil 26, is significant in terms of controlling primary and secondary flow at the trench cavity. In other words, the higher temperature and pressure combustion gases attempting to pass through the angel wing gap 60 is strongest at the platform edge 56, adjacent the leading edge 28 of the bucket. As a result, during rotation of the wheel, a cirucmferentially-undulating pattern of higher pressure combustion gas flow is established about the periphery of the rotor wheel, with peak pressures substantially adjacent each the bucket leading edge 28.

In order to address the bow wave phenomenon, at least to the extent of preventing the hot combustion gases from reaching the angel wing seal flange 54, the platform leading edge 56 is scalloped in a circumferential direction.

Figure 3:
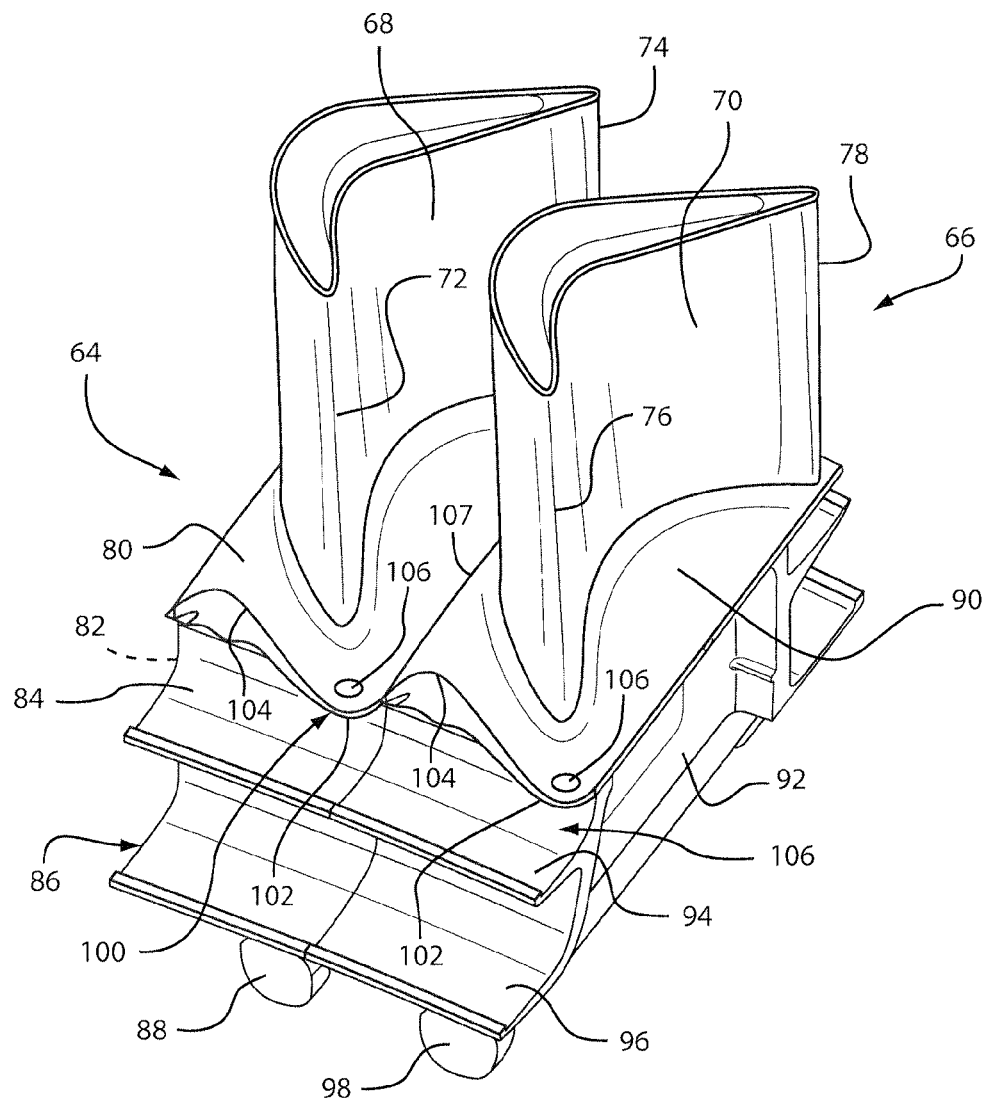
FIG. 3 is a perspective view of a turbine bucket pair illustrating a scalloped platform leading edge in accordance with an exemplary but nonlimiting embodiment of the invention.
Figure 4:
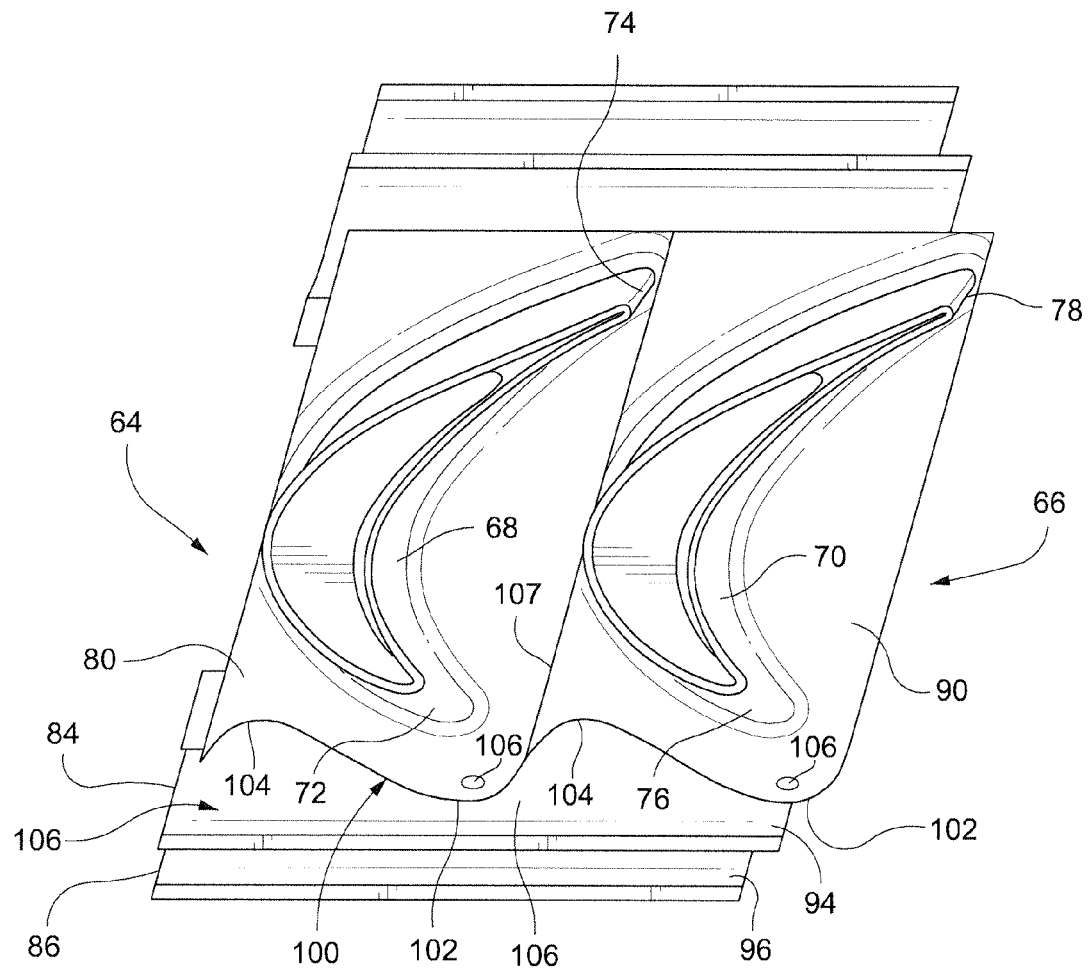
FIG. 4 is a plan view of the bucket pair shown in FIG. 3.
Figure 5:
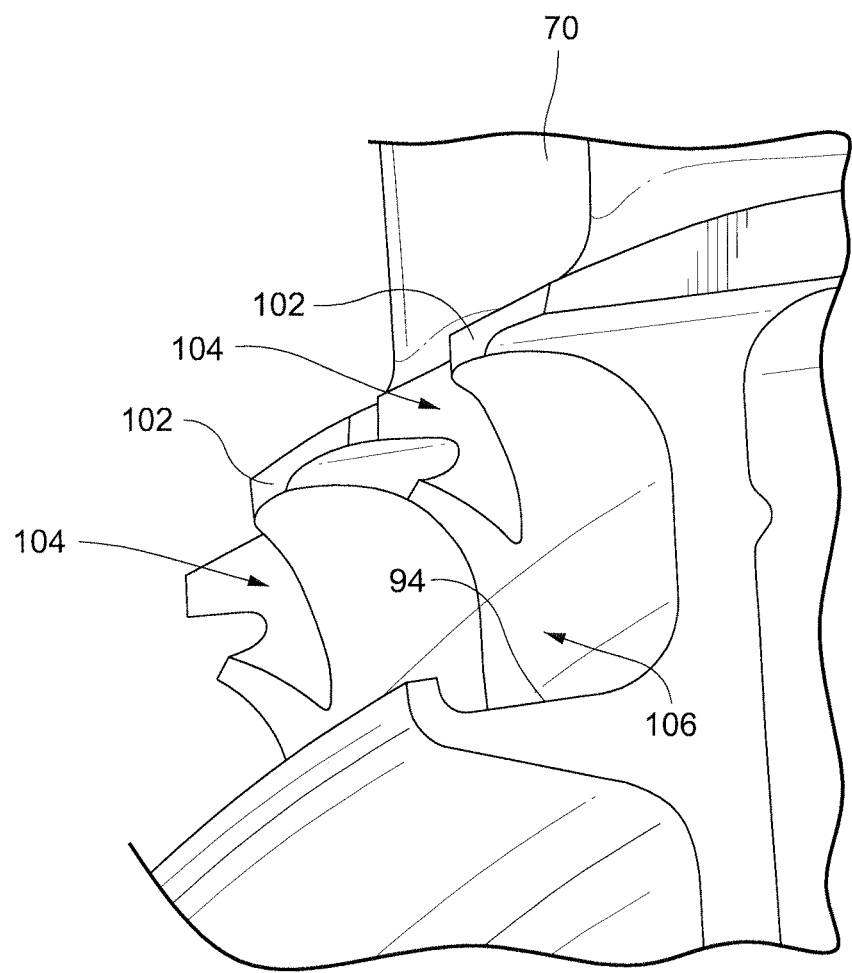
FIG. 5 is an end view, partially cut away, of the bucket pair shown in FIGS. 3 and 4.

More specifically, and as best seen in FIGS. 3-5, and 4, a pair of buckets 64, 66 are arranged in side-by-side relationship and include airfoils 68, 70 with leading and trailing edges 72, 74 and 76, 78 respectively. The bucket 64 is also formed with a platform 80, shank 82 supporting inner and outer angel wing seal flanges 84, 86 and a dovetail 88. Similarly, the bucket 66 is formed with a platform 90, shank 92 supporting angel wing seal flanges 94, 96 and a dovetail 98. Similar angel wing seals are provided on the trailing sides of the buckets but are of no concern here.

While the buckets 64, 66 are shown as single airfoil buckets, it will be appreciated that the two airfoils may be formed integrally in one bucket shown as a "doublet".

The platform leading edge 100 of the buckets (for convenience, the leading platform edges of the side-by-side buckets will be referred to in the singular, as the leading platform edge 100), in the exemplary but nonlimiting embodiment, is shaped to include an undulating or scalloped configuration defined by a continuous curve that forms substantially axially-oriented projections 102 alternating with recesses 104. The projections 102 extend in an axially upstream direction, adjacent the bucket leading edges 72, 76, thus blocking the flow of hot combustion gases at the bow wave from entering into the trench cavity 106. This continuous curve extends along adjacent buckets, bridging the axial gap 107 extending between adjacent, substantially parallel slash faces 108, 110 of adjacent buckets. The illustrated embodiment thus includes one projection 102 and one recess 104 per bucket, such that the circumferential length dimensions of the projection and the recess are each substantially half the circumferential length dimension of the platform leading edge. The projections 102 have an axial length dimension less than a corresponding axial length dimensions of the side-by-side angel wing seal flanges 84, 94. For so-called "doublets", where each bucket incorporates two airfoils, there would be two projections and two recesses per bucket, with circumferential length dimensions adjusted accordingly.

Thus, it will be appreciated that the projections 102 are located as a function of the strongest pitchwise static pressure defined by the combustion gas bow wave. As can be appreciated, the projections 102 prevent the hot combustion gas vortices from directly impinging on the angel wing seal flanges 84, 94, thus reducing temperatures along the seal flanges. The combustion pressures in the alternating recesses 104 circumferentially between the projections 102 are sufficiently offset by the cooler purge air entering the slash face gap 107 from the wheel space.

Optionally, one or more local purge air holes 106 (shown in only FIGS. 3 and 4) may be located within the projections 102 so that purge air pumped from the wheel space will tend to push the hot combustion gas vortices off the surface of the projections 102 and thus minimize temperature-related degradation of the platform edge as well.

Thus, by identifying problematic areas and targeting remedial geometry for selective application in those areas, modified secondary flow patterns are developed which enhance and extend the service life of the angel wing seals, platform edges, and hence the buckets themselves.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket comprising:
   a platform and an airfoil extending radially outwardly from said platform;
   a leading edge of said platform is defined by a continuous curve forming at least one axially-extending projection and an adjacent recess, said axially-extending projection located adjacent a leading edge of said airfoil, and
   at least one purge air hole extending through said at least one axially-extending projection.

2. The turbine bucket of claim 1 wherein said platform is further defined by a trailing edge and a pair of slash faces connecting said leading edge of said platform to said trailing edge of said platform; and wherein there is one axially-extending projection and one recess between said pair of slash faces.

3. The turbine bucket of claim 1 further comprising a radially inner mounting portion and a shank, said platform located radially between said shank and said airfoil; at least one axially-extending angel wing seal flange on a leading edge end of said shank thus forming a circumferentially-extending trench cavity along said leading edge of said shank, radially between an underside of said leading edge of said platform and said angel wing seal flange.

4. The turbine bucket of claim 3 wherein said at least one axially-extending projection has an axial length dimension less than a corresponding axial length dimension of said angel wing seal flange.

5. The turbine bucket of claim 1 wherein said axially-extending projection and said adjacent recess each have a circumferential length substantially equal to a circumferential length of said leading edge of said platform.

6. A turbine rotor wheel comprising:
   a disk mounting a plurality of buckets about a radially outer periphery of said disk, each bucket formed with a platform and an airfoil extending radially outwardly from said platform;
   wherein a leading edge of said platform of each of said plurality of buckets is defined by a continuous curve forming at least one axially-extending projection and an adjacent recess, said at least one axially-extending projection located substantially adjacent a leading edge of said airfoil, such that the continuous curves said plurality of buckets combine to form a circumferential continuous curve alternating between respective ones of said axially-extending projections and said adjacent recesses, and
   at least one cooling hole extending substantially radially through said at least one axially-extending projection.

7. The turbine rotor wheel of claim 6 wherein said platform is further defined by a trailing edge and a pair of slash faces connecting said leading edge of said platform to said trailing edge of said platform; and wherein there is one axially-extending projection and one adjacent recess between said pair of slash faces.

8. The turbine rotor wheel of claim 6 wherein each bucket further comprises a radially inner mounting portion and a shank, said platform located radially between said shank and said airfoil; and at least one axially-extending angel wing seal flange on a leading end of said shank thus forming a circumferentially extending trench cavity along said leading end of said shank, radially between an underside of said leading edge of said platform and said angel wing seal flange.

9. The turbine rotor wheel of claim 8 wherein said at least one axially-extending projection has an axial length dimension less than a corresponding axial length dimension of said angel wing seal flange.

10. The turbine rotor wheel of claim 6 wherein said axially-extending projection and said adjacent recess each have a circumferential length substantially equal to a circumferential length of said leading edge of said platform.

11. A method of controlling secondary purge air flow along an angel wing seal flange located radially inward of a turbine bucket platform leading edge comprising:
   (a) identifying an area of peak static combustion gas pressure along said platform leading edge where hot combustion gas vortices impinge on said angel wing seal flange;
   (b) shaping said platform leading edge so as substantially block the combustion as vortices from impinging on said angel wing seal flange in said area, and
   (c) forming one or more purge air holes in said at least one axial projection.

12. The method of claim 11 wherein step (b) comprises shaping said leading edge of said platform to have a continuous curve defining at least one axial projection and at least one adjacent axial recess, said at least one axial projection located at said area of peak static combustion gas pressure.

13. The method of claim 12 wherein said turbine bucket includes an airfoil having a leading edge and a trailing edge, said area of peak static combustion gas pressure located proximate said leading edge of said airfoil.

14. The method of claim 11 wherein, when a plurality of said turbine buckets are loaded onto a disk of a turbine rotor, leading edges of all said platforms combine to form a continuous undulating, scalloped configuration of alternating axial projections and axial recesses about said disk.

15. The method of claim 13 wherein, when a plurality of said turbine buckets are loaded onto a disk of a turbine rotor, leading edges of all said turbine buckets combining to provide a continuous undulating, scalloped configuration of alternating axial projections and axial recesses about said disk.

16. The method of claim 13 wherein step (b) includes forming one or more purge air holes in said at least one axial projection.

17. The method of claim 15 wherein step (b) includes forming one or more purge air holes in each of said alternating axial projections.

18. A turbine bucket comprising:
   a platform and an airfoil extending radially outwardly from said platform;
   a leading edge of said platform forming a continuous curve including a convex curved section extending the platform in an axial direction and a concave curved section, wherein said convex curved section is adjacent a leading edge of said airfoil and includes a purge air hole.

* * * * *

UNITED STATES PATENT AND TRADEMARK OFFICE
CERTIFICATE OF CORRECTION

| | | |
|---|---|---|
| PATENT NO. | : 8,827,643 B2 | Page 1 of 1 |
| APPLICATION NO. | : 13/282053 | |
| DATED | : September 9, 2014 | |
| INVENTOR(S) | : Ingram | |

It is certified that error appears in the above-identified patent and that said Letters Patent is hereby corrected as shown below:

In the Claims,

At column 6, line 29, add -- g -- to the front of the word "as" which is located between the words "combustion" and "vortices"

Signed and Sealed this
Second Day of December, 2014

Michelle K. Lee
*Deputy Director of the United States Patent and Trademark Office*